Dec. 17, 1935.     R. C. HILLSETH     2,024,859
COFFEE MAKER
Filed Sept. 22, 1934
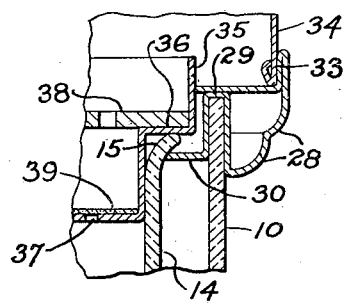
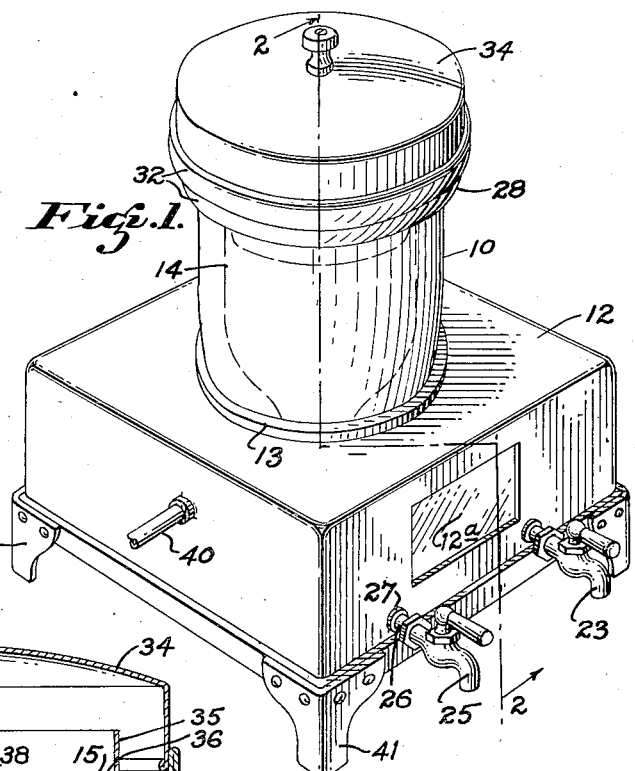
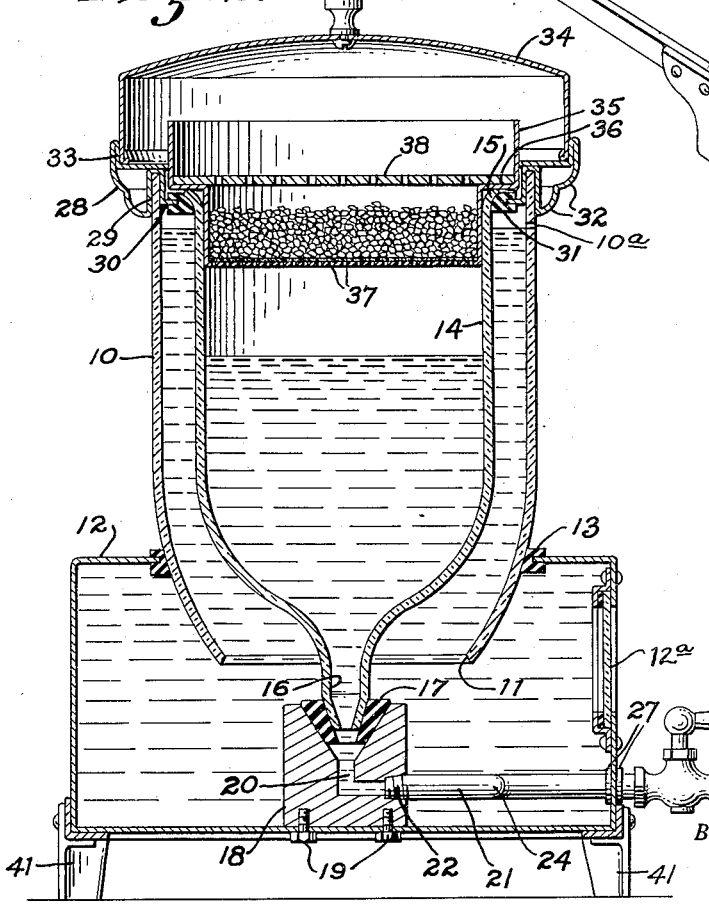
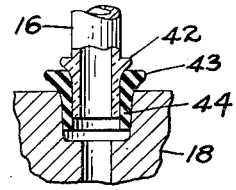
INVENTOR.
Robert C. Hillseth.
BY Jas. M. Naylor
ATTORNEY.

Patented Dec. 17, 1935

2,024,859

UNITED STATES PATENT OFFICE 2,024,859

COFFEE MAKER

Robert C. Hillseth, San Francisco, Calif.

Application September 22, 1934, Serial No. 745,070

3 Claims. (Cl. 53—3)

This invention relates to improvements in coffee makers.

The invention has for one of its objects the provision of a coffee maker particularly suitable for use in restaurants and other types of eating places.

Another object of the invention is the provision of a coffee maker which will be simple in construction, inexpensive to manufacture and yet efficient for the purpose designed.

Other objects of the invention will become apparent as the specification proceeds and the novelty of the invention will be particularly pointed out in the appended claims.

Briefly my invention comprises a coffee making device in which an inner container or reservoir is disposed beneath a coffee making element of the drip or filtration type, and an outer container, communicable with a water chamber, is provided to furnish a water jacket about the inner chamber, the coffee being drawn off by means of a conduit extending from the inner container through the water chamber.

Referring to the drawing forming a part of this specification,

Figure 1 is a perspective view of my coffee making device.

Figure 2 is a section taken along the lines 2—2 of Figure 1,

Figure 3 is an enlarged fragmentary sectional view of a portion of the upper construction of the device, and Figure 4 is an enlarged fragmentary sectional view of a modification of the bottom support for the inner coffee container of my device.

The numeral 10 designates the outer container, of glass or some other suitable material, opened at its upper end and having a restricted orifice 11 at its bottom end. A main hot water chamber 12 is provided as a base for my device, the same having an aperture in its top to receive container 10 for a portion of its length, and having annular washer 13 to insure a tight joint therebetween.

An inner coffee container or reservoir of glass 14 is flanged at its top, as at 15, and tapers at its lower end to form a spout 16. The said spout 16 of the inner container 14 is seated in the wedge-shaped washer 17, set in the recess of the supporting block 18, the latter being screwed or otherwise suitably fixed on the bottom of the container 12, as at 19. The block 18 has a pasage 20 extending therethrough to provide communication between the spout 16 and the horizontal discharge pipe 21, which is threaded, as at 22, to engage corresponding threads in said block, and extends through the side wall of the container 12, terminating in the tap 23.

The discharge pipe 21 is provided with an elbow 24 to permit the tap 23 to be mounted on one side of the container 12 in spaced relationship to a tap 25 communicable with the interior of the container 12, by means of the pipe 26. Both the pipes 21 and 26 are provided with suitable washers 27 at the point where they pass through the wall of the container 12.

A collar 28 is provided for the top of container 10 and has a vertical recess 29 into which the top of the latter fits, that portion of the said collar disposed on the inside of the container 10 being set outwardly at right angles to form a shoulder 30. The shoulder 30 is provided with an annular slotted washer 31, of rubber or some other suitable insulating material, which is adapted to carry or support the inner container 14 by means of the flange 15, into which the top of latter is tapered. In Figure 3 the washer 31 has been eliminated to demonstrate that, if desired, the tightness of the fit between flange or lip 15 of the inner container and the edge of shoulder 30 could be relied upon to prevent the escape of vapors or the entrance of water from the outer container.

The said collar 28 has a pair of annular bends or bulges 32 and tapers into an upstanding rim 33 within which the lid or cover 34 is adapted to be seated, from which point the said cover is bent on a horizontal plane and extends inwardly to a point flush with the innermost edge of the recess 29.

The coffee containing unit comprises a cup 35 having a shoulder 36 adapted to rest upon and be supported by the flange 15 of inner container 14 and the annular washer 31, the said cup extending downwardly into the inner container and having a series of perforations 37 in its bottom. A water spreader 38, comprised of a perforated disk of substantially the same diameter as the upper section of the cup 35 is adapted to rest upon the shoulder 36.

A conventional filter paper 39 is placed on the bottom of the cup 35 and, as shown in Figure 2, the granulated coffee is spread thereover in preparation for the making of the coffee.

As shown in Figure 1, the water chamber 12 is provided with a conduit 40 which leads to any suitable source of hot water (not shown).

Conventional legs 41 are provided for the water chamber to elevate the whole device to the extent that a cup may be inserted freely beneath the taps 23 and 25, when drawing off coffee or water as the case may be.

In the modification shown in Figure 4, the spout 16, of inner container 14, is shown as terminating in a straight-walled pipe having an annular shoulder 42 adjacent its mouth. Here the recess in the block 18 is a straight-walled bore adapted to receive a washer 44, the latter having a flanged mouth 43, upon which the shoulder 42 of spout 16 rests. It will be noted that the connections between spout 16 and block 18 shown in both Figures 2 and 4 are wedge-like, in that the more pressure diverted thereto the tighter the joint is rendered.

In order to prevent an over accumulation of air within the hot water jacket provided by outer container 10, a vent 10a is made in the latter adjacent the bottom edge of bulge 32 of collar 28 (see Figure 2).

A window 12a is provided in the front of chamber 12 to render the level of coffee within container 14 visible from the front at all times.

In preparing the device for the making of a fresh supply of coffee, the first step is to open the conduit 40 to permit a sufficient quantity of hot water to enter the chamber 12 to fill the latter and back up in the container 10 to the desired level. While no heating element has been shown in the drawing, it is to be understood that in order to keep the temperature of the coffee within the container 14 constant, the use of my invention contemplates the employment of a source of heat such as gas flame, electric hot plate or the like, under the apparatus. What is more, it will be understood that, with minor changes, my invention could employ a constant flow of hot water from a storage tank or boiler to maintain an even temperature within container 14 or a thermostatically controlled valve in conduit 40, to admit fresh supplies of hot water, could be utilized.

The second step is the placing of a fresh filter paper 39 on the bottom of cup 35 and then charging the cup with a predetermined amount of coffee. Next, the spreader 38 is put in position and boiling water is slowly poured thereover, extracting the juices of the coffee as it passes on through to the container 14, finding its lowest level in pipe 21 against tap 23.

It will be understood, of course, that a plurality of coffee making units of the type forming the subject matter of this invention may be employed in conjunction with an enlarged water chamber 12, as desired, and that the device will function as efficiently in a multiple assembly as in the unit disclosed in the accompanying drawing.

Having in mind the simplicity of design, the small number of parts, the facility with which the device may be dissembled for cleaning purposes, it is believed that I have produced a coffee maker which will be economical to manufacture and operate, as well as being more efficient for the purposes designed than the devices of this general class now available to users.

Having fully disclosed the nature of my invention, what I desire to secure by grant of letters patent and therefore claim is:

1. In a coffee making device, a reservoir having an annular flange at its intake end and tapering to a restricted nipple at its other end, a water jacket for said reservoir comprising an enlarged base member and a vertically disposed container, the latter extending above said reservoir, a support for the upper end of said reservoir comprising a collar having an annular slot therein to fit the top of said water jacket, said collar being bent interiorly of said jacket to form a rim upon which the flange on said reservoir rests, a support for the lower end of said reservoir consisting of an apertured block on the bottom of said base member adapted to receive the discharge end of said reservoir, a tap on the exterior of said base member, a conduit between the aperture in said block and said tap, a coffee filtration member having a restricted lower diameter adapted to fit within the upper ends of said jacket and said reservoir and rest upon the top of the latter, a rim on said collar, and a lid adapted to fit within said rim.

2. In a coffee making device, a reservoir having an annular flange at its intake end and tapering to a restricted nipple at its other end, a water jacket for said reservoir comprising an enlarged base member and a vertically disposed container, the latter extending above said reservoir, a support for the upper end of said reservoir comprising a collar having an annular slot therein to fit the top of said water jacket, said collar being bent interiorly of said jacket to form a rim, a slotted packing member fitting said rim and forming a support for the flange on said reservoir, a support for the lower end of said reservoir consisting of a block on the bottom of said base member, a right angle passage through said block, the upper end of said passage being wedge-shaped and having a packing member of corresponding shape therein to fit the discharge end of said reservoir, a tap on the exterior of said base member, a conduit between the aperture in said block and said tap, a coffee filtration member having a restricted lower diameter to fit within the upper ends of said jacket and said reservoir respectively and to rest upon the top of the latter, a rim on said collar of greater diameter than the top of said jacket, and a lid adapted to fit within said rim.

3. In a coffee making device, a reservoir having an annular flange at its intake end and tapering to a restricted nipple at its other end, a water jacket for said reservoir comprising an enlarged base member and a vertically disposed container, the latter extending above said reservoir, a support for the upper end of said reservoir comprising a collar having an annular slot therein to fit the top of said water jacket said collar being bent interiorly of said jacket to form a rim, a slotted packing member fitting said rim serving to support said flange on said reservoir, a support for the lower end of said reservoir consisting of a block on the bottom of said base member, a right angle passage through said block, the upper end of said passage being wedge-shaped and having a packing member of corresponding shape to receive the lower end of said reservoir, a tap on the exterior of said base member, a conduit between the passage in said block and said tap, a tap on the exterior of said base member in communication with said water jacket, a conduit in said base member connecting said water jacket to a suitable hot water supply, a coffee filtration member having a restricted lower diameter to fit within the upper ends of said jacket and said reservoir respectively and rest upon the top of the latter, a perforated water spreader within said filtration member, a rim on said collar of greater diameter than the top of said jacket, and a lid adapted to fit within said rim.

ROBERT C. HILLSETH.